J. C. GARROTT.
TRACTOR PLOW.
APPLICATION FILED SEPT. 7, 1917.
1,280,011.
Patented Sept. 24, 1918.
2 SHEETS—SHEET 1.
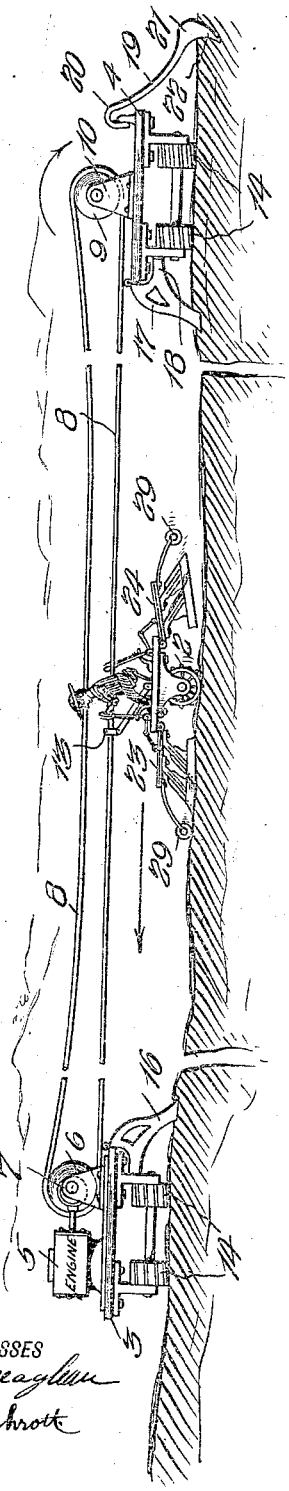
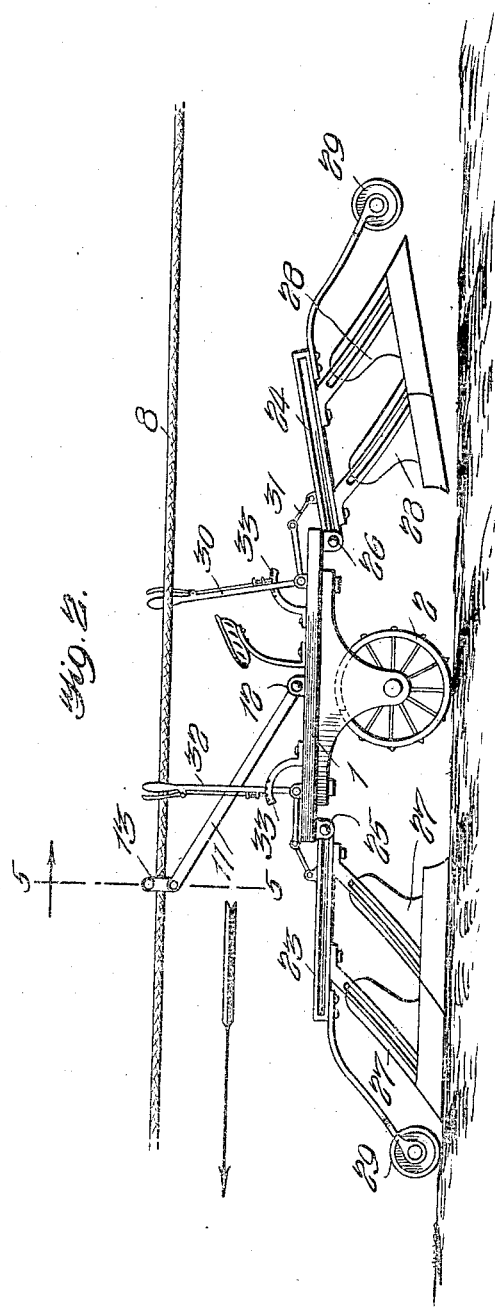
WITNESSES
INVENTOR
JOSEPH C. GARROTT,
BY
ATTORNEYS

J. C. GARROTT.
TRACTOR PLOW.
APPLICATION FILED SEPT. 7, 1917.

1,280,011.

Patented Sept. 24, 1918.
2 SHEETS—SHEET 2.

WITNESSES
E. M. Callaghan
J. B. Schrott

INVENTOR
JOSEPH C. GARROTT,
BY
Munn & Co.
ATTORNEYS

UNITED STATES PATENT OFFICE.

JOSEPH CHARLES GARROTT, OF BRADDOCK HEIGHTS, MARYLAND.

TRACTOR-PLOW.

1,280,011.             Specification of Letters Patent.     Patented Sept. 24, 1918.

Application filed September 7, 1917. Serial No. 190,220.

*To all whom it may concern:*

Be it known that I, JOSEPH CHARLES GARROTT, a citizen of the United States, and a resident of Braddock Heights, in the county of Frederick and State of Maryland, have invented a new and useful Improvement in Tractor-Plows, of which the following is a specification.

My invention relates to improvements in tractor plows, and it consists in the constructions, combinations, and arrangements herein described and claimed.

An object of my invention is to provide a tractor plow which includes a plow truck having plow carrying means on each end, and which is movable between two anchorages at the extremities of a plot of land to be plowed.

Another object of the invention is to provide a portable anchorage having a strut with a driving head whereby the strut may be driven into the ground to hold the portable anchorage in place.

Another object of the invention is to provide a plow truck having a central bull wheel with right and left-hand plows mounted on plow means at either end, and adjusting mechanisms whereby one or the other plow means may be lowered to bring the plows into engagement with the ground according to the direction in which the plow truck is traveling.

Another object of the invention is to provide an extension bar with a clamp device for clamping the bar onto a moving cable by which the plow truck is pulled across the field, the extension bar being carried by the plow truck.

Other objects and advantages will appear in the following specification, reference being had to the accompanying drawings in which:

Figure 1 is a side elevation showing the essential features of the invention.

Fig. 2 is an enlarged side elevation of the plow truck and its carried parts.

Figure 3:
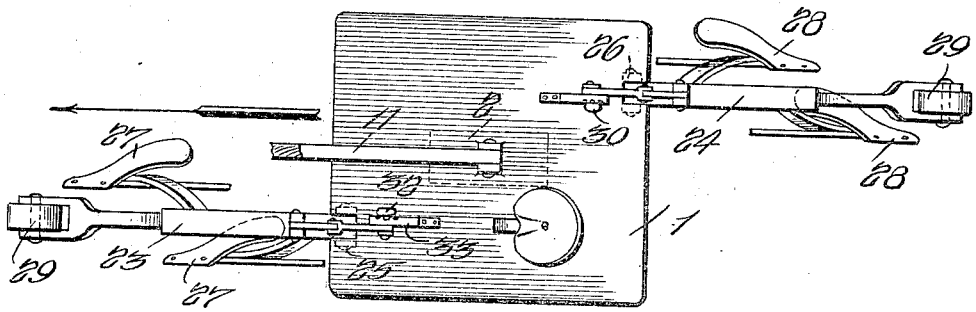
Fig. 3 is a plan view of the plow truck showing the right-hand and left-hand plows.
Figure 4:
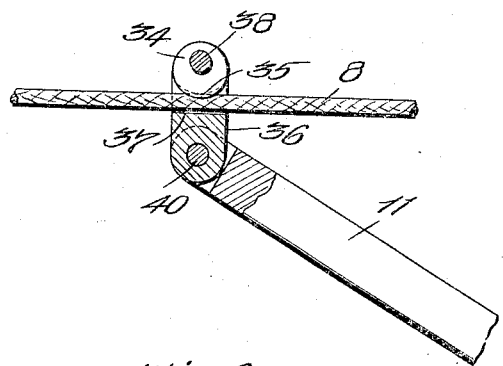
Fig. 4 is a detail view showing the clamping eccentrics of the extension bar.
Figure 6:
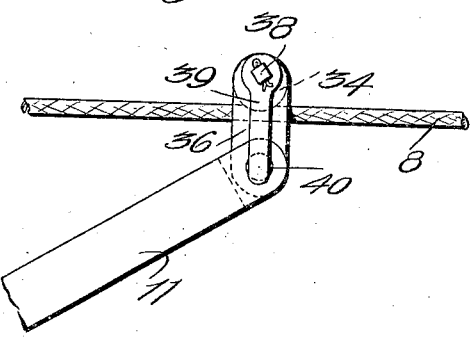
Fig. 6 is a side view showing the pivoted extension head of the bar.

In carrying out my invention, I provide a plow truck 1 which is supported upon a bull wheel 2 and arranged to be drawn between an engine truck 3 and a portable anchorage 4. The engine truck 3 has an engine 5 which is arranged to drive a large pulley 6 which has bearings in journals 7.

A cable 8 is applied to the pulley 6 and moves over a pulley 9 supported in journals 10 on the portable anchorage 4. The plow truck 1 has an extension bar 11 which is pivoted thereto at 12, and a clamping device 13 by which the plow truck 1 is attached to one or the other of the strands of the cable 8.

Thus the engine truck 3 and the portable anchorage 4, are supported by ground wheels 14 which are carried by suitably arranged shafts supported in bearings beneath the engine truck and the portable anchorage, respectively. The engine truck 3 has a brace 15 which is pivoted to the engine truck, and has a heel 16 adapted to engage a solid portion of the engine truck frame when the brace is fixed into the ground as shown in Fig. 1.

The portable anchorage 4 also has a brace 17 provided with a heel 18 to engage a solid portion of the portable anchorage when the brace 17 is forced into the ground as shown. A strut 19 is pivoted at 20 on the back of the portable anchorage, and has a driving head 21 and a driving point 22 which may be driven into the ground by a sledge hammer. The portable anchorage 4 is moved laterally, the distance of two furrows and then temporarily fixed in place by pressing the brace 17 into the ground and driving the point 22 into the ground. The portable anchorage 4 is thus firmly held.

The plow truck 1 has plow beams 23 and 24 pivoted at 25 and 26 on the respective ends thereof. The plow beam 23 has a gang of right-handed plows 27, while the beam 24 has a gang of left-handed plows 28. Colters 29 are located in front of the respective plow gangs and supported from the respective plow beams substantially as shown.

Figure 5:
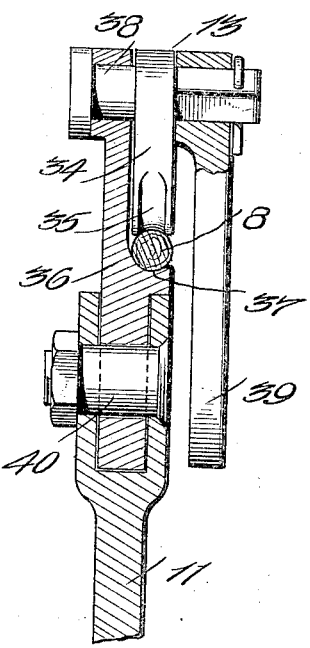
Fig. 5 is an enlarged cross section of the parts shown in Fig. 4.

The plow beam 24 is raised to elevate the gang 28 from the ground when the plow truck travels across the field in the direction indicated by the arrow in Fig. 1, by a lever 30 which has a link connection 31 with the plow beam 24. A similar lever 32 controls the plow beam 23, and each lever 30 and 32 has a quadrant to hold the respective plow beams in their adjusted positions. It will be seen in Figs. 1 and 2, that the plow gang 28 is raised when the plow truck travels across the field in the direction indicated by the arrow, and that the plow gang 27 is in the lowered position to plow a double furrow across the field. The clamping device 13 by which the extension bar 11 is quickly attached to one or the other of the strands of the cable 8, is subject to some variation in construction, but a representative form is illustrated in Fig. 5. The clamping device 13 includes an eccentric 34 which has a groove 35, the surface of which binds upon the cable 8 as shown. The eccentric 34 cooperates with a pivoted clamp head 36 which has a rounded groove 37 also for receiving the cable 8. The eccentric 34 is fulcrumed on the clamp head 36 at the stud 38 which has a square end receiving an eccentric handle 39.

The clamp head 36 is pivoted on a bolt 40 fitted in the forked end of the extension bar 11. The handle 39 is turned in one or the other direction to rotate the eccentric 34 on its pivot stud 38 to move the grooved portion 35 out of engagement with the groove 37 of the clamp head 36, to free the cable 8 from the extension bar.

The operation of the device is as follows: The provision of the right and left-handed gang plows permits the plowing of a furrow each time the plow truck 1 moves across the field. The provision of double plows in each gang permits the plowing of a double furrow each time. The plow gangs may have an increasing number of plows, when the furrow thus plowed will be accordingly wider.

In referring to Fig. 3, it will be seen that the earth thrown over by the mold boards of the plows 27 traveling toward the right, will just fall to one side of the land side of the plows 28 on the other gang. It therefore follows, that when in returning, and the plows 28 are let down, the earth thrown over on the land side of said plows, will fall in the same direction that the earth of the plows 27, fell. It is necessary to move the truck 3 and the portable anchorage 4 over, only after the plow truck 1 has traversed the field once each way.

When the plow truck travels across and nears the engine truck 3, the operator of the plow truck simply strikes the handle 39 to loosen the eccentric 34 from the cable 8, when he can grasp the clamp head of the extension bar 11 in his hands, and fix it on the other strand of the cable 8 which, of course, travels in the other direction. The plow truck 1 is thus pulled back, the plow gang 28 having been lowered in the meantime to plow a corresponding strip of earth similar to that plowed by the gang 27.

It should be understood that the anchorage 4 embodies one of the essential features of the invention. The brace 17 co-acts with the strut 19 to hold the anchorage 4 firmly in position. The driving of the point 22 of the strut 19 into the ground, is the work of but a few moments, and when the point 22 is firmly driven into the ground, the anchorage 4 will be held securely enough for the purpose for which it is intended.

While the construction and arrangement of the device is that of a generally preferred form, obviously modifications and changes may be made without departing from the spirit of the invention or the scope of the claims.

I claim:

1. In a device as described, the combination of portable anchorages spaced apart, an endless continuously movable cable between the anchorages, a plow truck movable between the anchorages, and means for detachably connecting the plow truck with one or the other of the strands of the cable, to convey the plow truck in alternate directions without stopping the cable.

2. In a device as described, the combination of portable anchorages spaced apart, an endless cable movable between the anchorages, a plow truck movable between the anchorages, an extension bar carried by the plow truck, and clamping means mounted on the extension bar whereby the extension bar may be quickly attached to one or the other of the strands of the cable.

3. In a device as described, the combination of portable anchorages spaced apart and having bracing means for entering the ground, an endless cable movable between the portable anchorages, an engine carried by one of the anchorages for driving the cable, an extension bar carried by the plow truck, and a hand-operated clamping device pivoted on the extension bar and adapted to engage one or the other of the movable cable strands.

4. In a device as described, the combination of portable anchorages spaced apart and having bracing means for entering the ground, an endless cable movable between the anchorages, a plow truck movable beneath the cable, and an extension bar carried by the plow truck having means for detachably connecting said bar to one or the other of the oppositely moving strands of the cable.

5. In a device as described, a portable anchorage having ground wheels and a pulley, an endless cable applied to the pulley, a brace on one side of the anchorage for engaging the ground, and a strut pivoted on the other side of the anchorage having a driving point and a driving head whereby the point is driven into the ground.

6. In a device as described, a portable anchorage comprising a platform having journals on the bottom and ground wheel axles supported in the journals, a pulley supported on top of the platform and arranged to guide an endless cable, a brace pivoted on one side of the platform having a portion engaging the ground and a heel engaging a solid portion of the anchorage frame, a strut pivoted on the other side of the platform, the strut having a driving point and a driving head whereby the point is driven into the ground.

7. The combination, in a portable anchorage having a relatively light body including a platform, and means for stabilizing the anchorage comprising a brace on one side adapted to engage the ground, with a heel abutting a portion of the anchorage, and a strut on the other side with a driving point adapted to be driven into the ground.

JOSEPH CHARLES GARROTT.

Witnesses:
F. B. SAPPINGTON, Jr.,
ERNEST C. WEBB.

Copies of this patent may be obtained for five cents each, by addressing the "Commissioner of Patents, Washington, D. C."